US005456301A

United States Patent [19]

Wise

[11] Patent Number: 5,456,301

[45] Date of Patent: Oct. 10, 1995

[54] TIRE TREAD WITH IMPROVED RESISTANCE TO CHUNKING

[75] Inventor: Thomas E. Wise, Greer, S.C.

[73] Assignee: Uniroyal Goodrich Licensing Services, Inc., Dover, Del.

[21] Appl. No.: 142,543

[22] Filed: Oct. 22, 1993

Related U.S. Application Data

[63] Continuation-in-part of Ser. No. 737,861, Jul. 30, 1991, abandoned.

[51] Int. Cl.$^6$ ..................................................... B60C 11/13
[52] U.S. Cl. .................................. 152/209 R; 152/209 A; 152/209 B; 152/209 D; 152/DIG. 1
[58] Field of Search .......................... 152/209 R, 209 D, 152/209 B, 209 A, DIG. 1

[56] References Cited

U.S. PATENT DOCUMENTS 3,707,177  12/1972  Boileau ........................ 152/209 R
4,177,850  12/1979  Ogawa et al. .
4,796,683   1/1989  Kawabata et al. .
4,955,415   9/1990  Takemchi et al. .

FOREIGN PATENT DOCUMENTS 0463643  3/1950   Canada .............................. 152/209 R
 211717  3/1972   Germany ........................... 152/209 D
2422707 11/1975   Germany ........................... 152/209 R
0098002  8/1975   Japan ................................ 152/209 D
0022601  1/1989   Japan ................................ 152/209 D Primary Examiner—Adrienne Johnstone
Attorney, Agent, or Firm—Robert R. Reed; Alan A. Csontos

[57] ABSTRACT

A tire for use on a vehicle capable of spinning the tire relative to the ground surface that the vehicle is operable upon. The tire includes a plurality of ground engagable tread elements. Each of said tread elements at least partially defines a transversely extending groove. The improvement comprises a relief located at the intersection of the groove and the ground engaging portion of the tread element. The relief reduces the propensity of chunking of a leading edge of the tread element during operation of the tire.

20 Claims, 5 Drawing Sheets

TIRE TREAD WITH IMPROVED RESISTANCE TO CHUNKING

This is a continuation-in-part of application Ser. No. 07/737,861, filed on Jul. 30, 1991, now abandoned.

BACKGROUND OF THE INVENTION

1. Technical Field

The present invention relates generally to improvements in treads for a vehicle tire. In particular, the present invention relates to improvements to discrete tread elements of tires used in off-road racing.

2. Description of the Prior Art

A tire which is subjected to severe conditions such as off-road racing, could develop chunking problems to the tread even after short usage. Such severe conditions are often encountered in desert racing. The chunking problem is typically present at the leading edge of a tread element.

A tire used for desert racing typically has a tread pattern which includes at least a plurality of circumferentially arranged discrete tread block elements. The tread block elements are relatively deep to provide sufficient surface area at its leading and trailing edges to provide sufficient traction in such environments. However, in such severe conditions, the tread of the tire not only encounters soft and loose terrain such as sand, but encounters relatively hard and solid objects such as rocks, trees or other debris.

Chunking is a phenomena which mostly occurs to tires used on high performance vehicles. Such vehicles are capable of spinning the tires relative to the ground surface that the vehicle operates on. Specifically, spinning occurs when the rotational speed of the tire is greater than the ground speed traversed. When spinning occurs, and when a tread block element impacts a solid object, the leading edge, of the tread block element as viewed in the direction of tire rotation, tears out from such impact. The chunking is mostly aesthetically unpleasing but can lead to further cracking of the tread block element if any sharp edges are created due to the chunking of the tread block element. This also creates a premature wear problem in the tire.

SUMMARY OF THE INVENTION

The present invention provides improvements to a tread for a vehicle tire. The improvements increase the resistance to chunking of a leading edge of a tread element. The tire is particularly suitable for use on high performance vehicle which is used for off-road racing.

The invention of the applicant relates to improvements to discrete tread element of tires used in off-road racing. The tire is subjected to severe conditions and can develop chunking problems even after short usage. The tread block elements are relatively deep (deep grooves) to provide sufficient leading and trailing edges for sufficient traction in such environments. The tread encounters relatively hard and solid objects such as rocks, trees, or other debris. These tires are used on high performance vehicles capable of spinning the tires. It is well known in the art that wear of these tires is not a concern. Features of tire treads that have even very slight wear do not teach how to avoid chunking. The off-road worn tire does not have the desirable utility. The tread includes a plurality of tread elements arranged in a substantially circumferential array about the outer circumference of the tire. Each of the plurality of tread elements is at least partially defined by a leading edge surface, a trailing edge surface, and a ground engaging surface. The leading edge and trailing edge surfaces of circumferentially adjacent tread elements, taken in a circumferential plane of the tire, are positioned symmetrically relative to the line extending radially of the axis of rotation of the tire. Each of the leading edge surfaces and the trailing edge surfaces include relief means located at a radially outermost location of the respective tread elements.

The relief means 122 is located entirely within the radially outermost 33 percent of the depth D of a groove. The groove is defined by a leading edge surface of a tread element and a trailing edge surface of a circumferentially adjacent tread element. The groove has a depth of at least 0.450 inch. The relief means includes a concave radiused surface extending in a direction substantially parallel to the extent of a respective one of the leading and trailing edge surfaces. The radiused surface has a circular radius of at least 0.150 inch. The leading and trailing edge surfaces extend at an acute angle relative to the circumferential plane of the tire. The acute angle is preferably in the range of 5 degrees to 60 degrees.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

The tread of the tires in this invention are new tires, or tires which only recently have been recapped. In fact, to use the invention of the applicant, tires must be recapped after any wear, which would restore the relief means located at the outermost location of the respective tread element. The tire can also be reversed to present a new less worn leading edge.

Figure 1:
FIG. 1 is a perspective view of a tire having a tread embodying the present invention.
Figure 2:
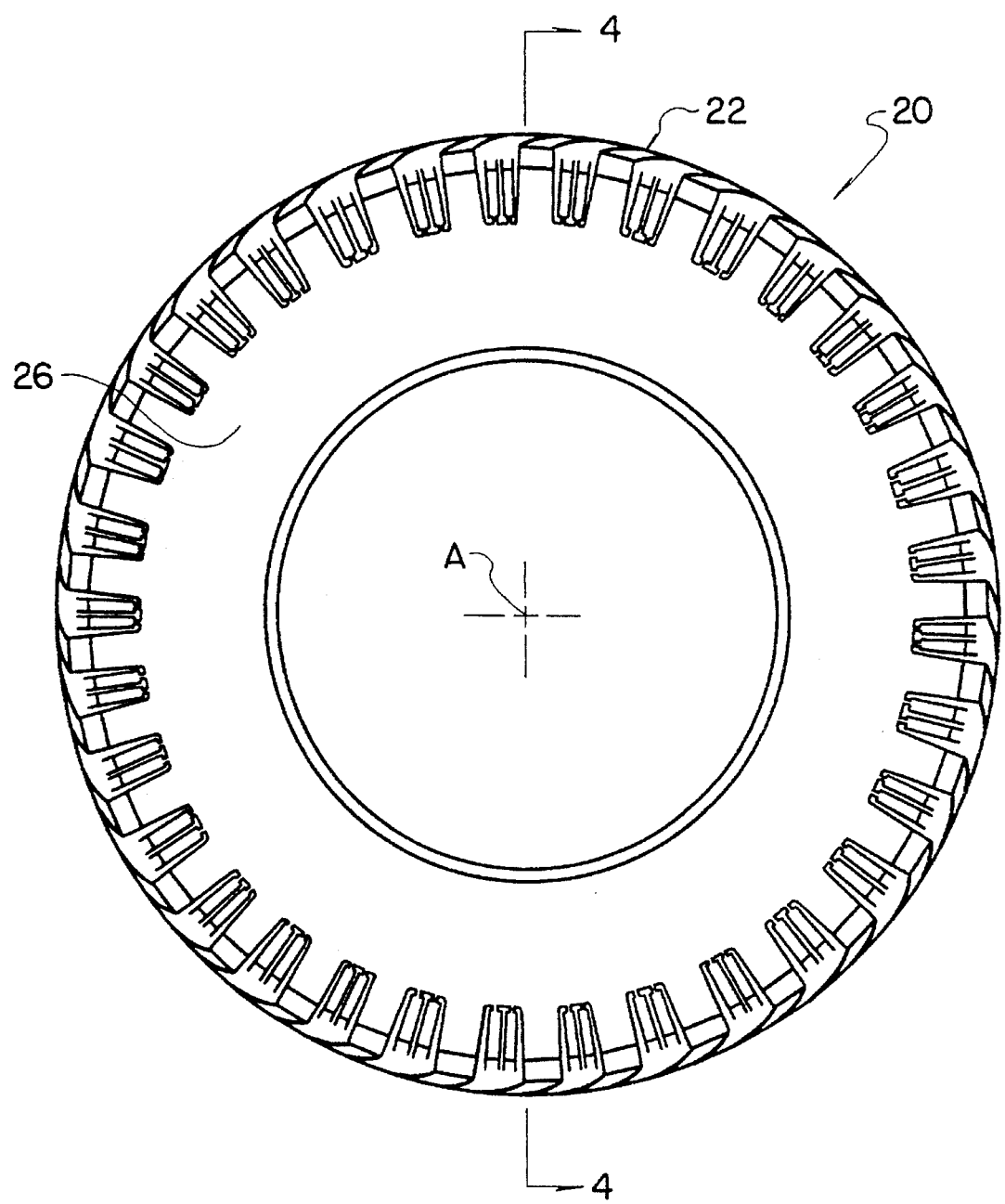
FIG. 2 is a side view of the tire illustrated in FIG. 1.
Figure 5:
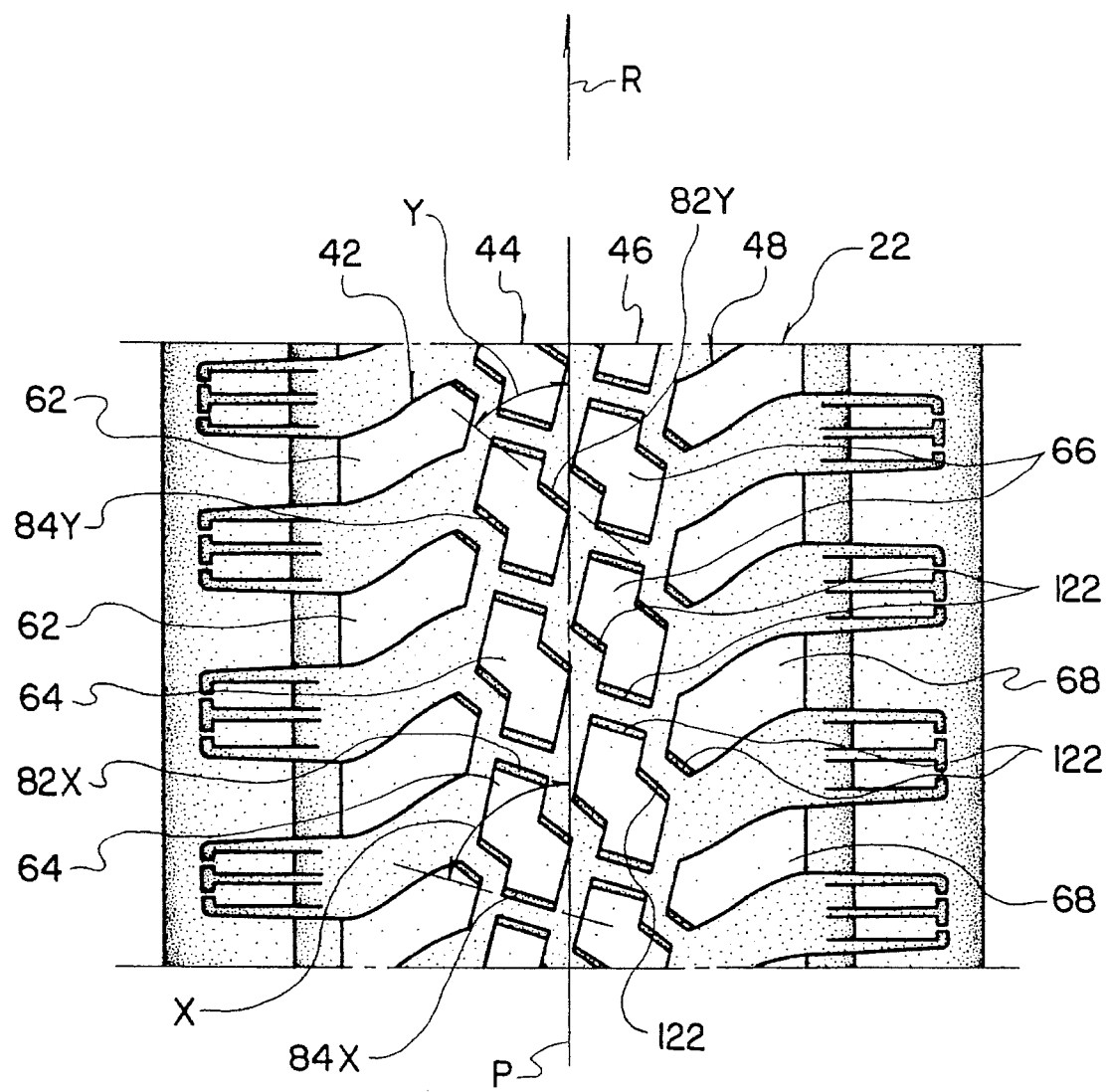
FIG. 5 is an enlarged planned view of a portion of the tread illustrated in FIG. 3.
Figures 6, 7:
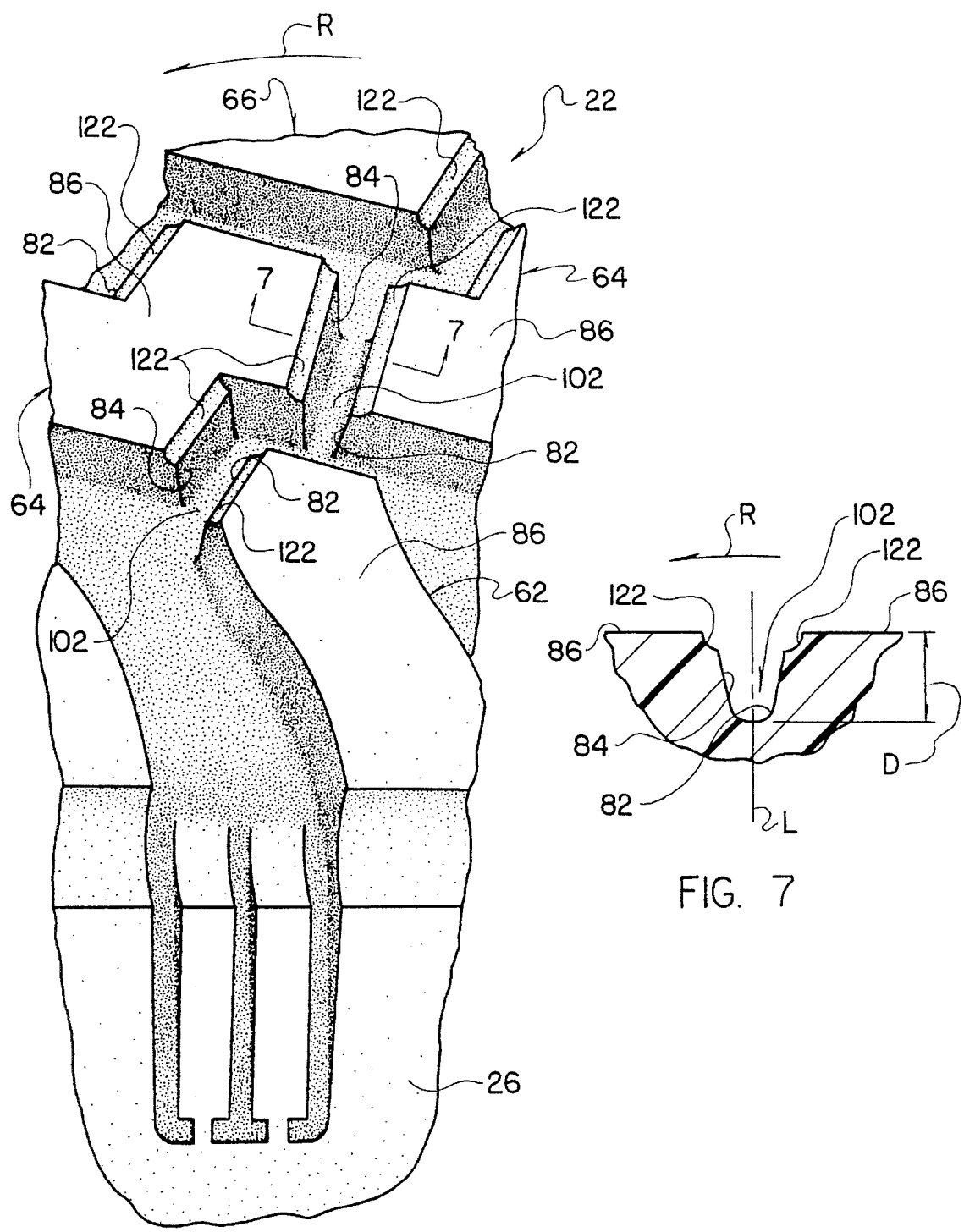
FIG. 6 is an enlarged perspective view of a portion of the tire illustrated in FIG. 1.
FIG. 7 is a cross-sectional view of the portion of the tire illustrated in FIG. 6, taken approximately along line 7—7 in FIG. 6.

The invention of the applicant relates to the structure of the tread elements and particularly to the leading edge surface, the trailing edge surface and a ground engaging surface. The relief means of the radially outermost location of the edge surfaces have a concave radiused surface. This is one continuous curvilinear surface as illustrated in FIGS. 1, 6, and 7. There are no straight flat segments tangent to the radiused surface at its radially outermost edge or at its radially innermost edge. It is one radiused surface. There is no difference between any of the radiused surfaces at any respective location circumferentially or widthwise across the tread surface. Transversely extending tread elements 68 do not have radiused surfaces 122 when the acute angle Y is greater than 85 degrees (FIG. 5) and preferably greater than 75 degrees. Relief surfaces 122 are preferably contained in the central portion of the tread as illustrated. Transverse tread elements with radiused surfaces have other performance problems, such as tire noise.

The intermediate edge surfaces (82Y and 84Y) of this invention extend at an acute angle greater than 20 degrees relative to the mid-circumferential plane. This results in a smoother ride than would occur if the surfaces extended perpendicular to the mid-circumferential plane.

Figures 3, 4:
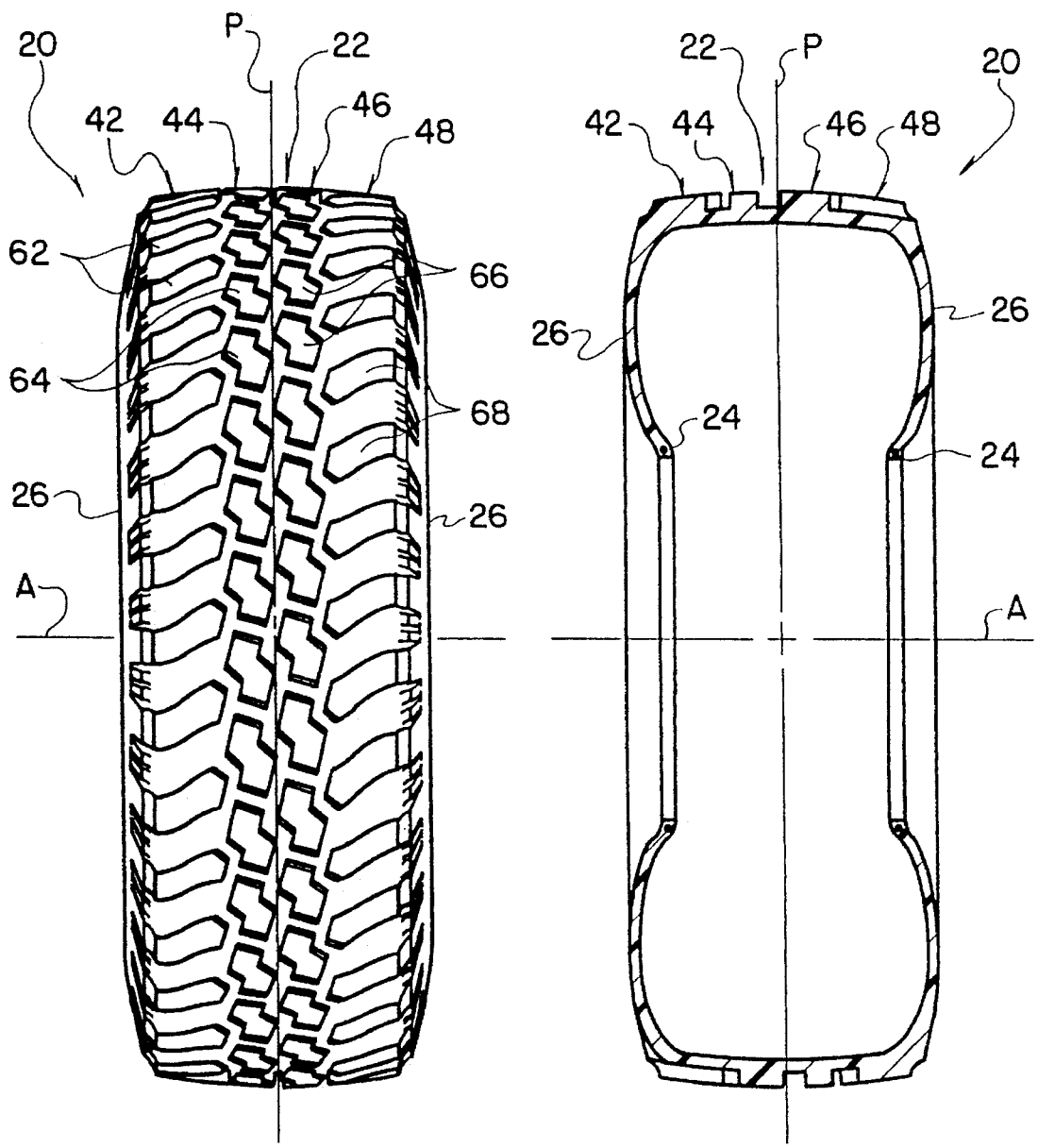
FIG. 3 is a frontal view of the tire illustrated in FIG. 1.
FIG. 4 is a cross-sectional view of the tire illustrated in FIG. 2, taken approximately along line 4—4 in FIG. 2.

A tire 20 embodying the present invention is illustrated in FIG. 1. The tire 20 is suitable for use on a high performance vehicle, such as a vehicle used for off-road racing and particularly for desert racing. The tire includes an improved tread 22 which resist chunking. The tire 20 is rotatable about a longitudinal central axis A. A mid-circumferential plane P bisects the tire 20 and extends perpendicular to the axis of rotation A. The tire 20 includes a pair of annular beads 24 (FIG. 4). A sidewall 26 extends radially outward from a respective bead 24. The tread 22 is located between radially outermost portions of the sidewalls 26.

The tread 22 (FIGS. 3 and 5), includes four substantially circumferentially arranged ribs 42,44,46,48. Each rib 42,44, 46,48 includes a plurality of tread elements 62,64,66,68 respectively, arranged in a substantially circumferential array about the outer circumference of the tire 10. Discrete individual tread element 62,64,66,68 are preferred rather than continuous ribs in a tire for off-road use because more radial surface area is exposed to provide traction or "bite" between a rotating tire and a loose ground surface.

Each of the tread elements 62,68 of the axially outermost ribs 42,48 are substantially transversely extending relative to the mid-circumferential plane P of the tire 20. Each of the tread elements 64,66 of the axially innermost ribs 44,46 have a substantially "inverse Z-shape", as viewed in FIG. 5. That is, the tread elements 64,66 extend substantially in the circumferential direction of the tire 20. While specific shapes of the tread elements 62,64,66,68 are illustrated in the Figs., it will be apparent that the concept of the present invention can be embodied in other shapes and configurations of tread elements, as long as circumferentially distinct tread elements exist.

Each of the tread elements 62,64,66,68 is at least partially defined by a leading edge surface 82 (FIG. 7) when viewed in the direction of rotation R of the tire 20, a trailing edge surface 84, and a ground engaging surface 86. The leading edge surface 82 and the trailing edge surface 84 are each a substantially planar surface. The leading edge surface 82 and trailing edge surface 84 of circumferentially adjacent tread elements 64,66 define a transversely extending groove 102. The groove 102 has a depth D taken in a radial direction of at least 0.450 inch and preferably is about 0.580 inch. The leading edge surface 82 and trailing edge surface 84 of adjacent tread block elements are positioned symmetrically relative to a radially extending line L, as illustrated in FIG. 7. FIG. 7 is taken in a plane extending parallel to the mid-circumferential plane P of the tire 20.

At fore-and-aft edge surfaces 82X, 84X of each tread element 64,66, the leading edge surface 82X (FIG. 5) and the trailing edge surface 84X extends at an acute angle X which is less than about 85° relative to the mid-circumferential plane P of the tire and is preferably less than 75°. At intermediate edge surfaces 82Y, 84Y of each tread element 64,66, the leading edge surface 82Y and the trailing edge surface 84Y extend at an acute angle Y which is greater than about 20° relative to the mid-circumferential plane of the tire and preferably is greater than 35°. It is desirable that the leading edge surfaces 82 and the trailing edge surfaces 84 are angled relative to the mid-circumferential plane P of the tire 20 and to the direction of rotation R of the tire. This angled orientation enables a relatively smoother ride than would occur if the surfaces extended perpendicular to the mid-circumferential plane P of the tire 20. This smoother ride is enabled because the impact of each tread element on the ground surface is distributed gradually over the leading edge surface 82 rather than all at one time.

Each tread element 64,66 has at least one relief 122 (FIGS. 5, 6 and 7) is provided. The relief 122 is located at an intersection of a leading edge surface 82 and a respective ground engaging surface 86 or at an intersection of a trailing edge surface 84 and the ground engaging surface 86. The relief 122 acts to decrease the amount of chunking which could occur particularly at the leading edge surfaces 82 of the tread elements 62,64,66,68. Essentially, the relief 122 is provided by removing material from the region of the intersection of the leading edge surface 82 and the ground engaging surface 86. Increased resistance to chunking at the trailing edge surfaces 84 has also been observed by providing a relief 122.

The relief 122 is preferably a concave radiused surface having no flat tangent segments (FIG. 6 & FIG. 7) and which extends in a direction substantially parallel to the extent of the respective leading edge surface 82 or trailing edge surface 84. A means for relief of the occurrence of chunking of the tread elements 62, 64, 66, 68 is provided at a location where the flat edge surfaces 82, 84 potentially intersect the ground engaging surface 86. Therefore, the relief 122 may be referred to herein as a "relief means". By placing the relief 122 on both the leading edge surface 82 and the trailing edge surface 84, a non-directional tire is provided. Thus, mounting the tire 20 on a rim is relatively easy since direction is unimportant. Furthermore, after usage, the tire can be reversed on its rim to present a new and presumably less worn leading edge.

The relief means 122 has a shape being a smooth concave surface; with no abrupt change in its curvilinear surface that may produce stress concentrations. Any stress concentrations will dramatically increase chunking of the tread. Therefore, the surface of the relief 122 has preferably a substantially constant radius of curvature. The depth of the relief 122 is also limited to the outermost one third of the groove depth to provide adequate support and stiffness to each tread block and contact surface 86. The amount of material removed by the relief 122 from the intersection of contacting surfaces 86 and edge surfaces 82, 84 influences the regidity of the tread elements 62–68. This improves the traction of the tire and acceleration of the vehicle. However, the void ratio of the tire tread must be maintained for proper off-road racing performance. It is desirable to have an angle between the surface of the relief 122 and the contacting surface 86 of approximately 90 degrees for biting into the off-road surface. It is also desirable to have an angle between the surface of the relief 122 and the edge surface 82 and 84 of approximately 90 degrees to form an abrupt change in the tread block dimensions as near as possible to the contact surface 86 and still provide a biting edge at the contacting surface 86.

The relief 122 radius is at least 0.150 inch and preferably is 0.188 inch. The relief 122 is located entirely within the radially outermost 33 percent of the depth D of the groove 102. Alternatively defined, the relief 122 is located entirely within 0.150 inch of the ground contacting surface 86 of the tread elements 62, 64, 66, 68. The preferred relief 122 are rely on edge surfaces 82, 84 within the central portion of the tread (FIG. 5).

Thus, the relief 122 enables longer tread life without chunking than previously known prior art tires. Thus, when the tire 20 rotates relative to the ground surface over which it operates and encounters a relative hard object such as a rock, tree or other debris, the impact of the leading edge surface 82 upon such object does reduce or relieve the occurrence of chunking. Specifically, there is reduced material at the leading edge of the tread element to compress and effect movement and tearing of the tread element during spinning of the tire.

Blocks 62 and 68 in the widthwise edge portions of the tread clearly have no relief 122 at the leading edge surface or the trailing edge surface. The recess (groove) between these edges is a full depth groove 102, as illustrated in FIGS. 1, 5, and 6. The decrease in groove width due to tread wear at the widthwise edge portion is very small, conversely the decrease in groove width in the central section of the tread 22 with wear is substantially greater. Regardless, these changes in the groove width of the tread 22 are not important to the utility of this invention by the applicant. The relief 122 at the intersection of a leading edge surface 82 and a ground engaging surface 86 of the tread element is essential to this invention and must be replaced by recapping when the tread becomes worn.

The essential features of the invention by the applicant is the relief means at the top edge of each tread block in the central part of the tread width. The relief means are all the same being a single concave radiused surface in each leading edge surface and trailing edge surface. The essential feature of the patent by Boileau is the width of the recessed portions having a greater variation as a function of depth at the edges than in the central part of the tread. The invention by the applicant has no relief means at the widthwise edges of the tread, and any variation in groove width at the edge of the tread is small.

The relief 122 also provides an increased void ratio for operation of the tire in loose dirt, sand, mud or snow. The void ratio is defined as the percent of non-ground-contacting area of the tire divided by the total tread area of the tire. Preferably, a new tire 20 embodying the present invention will have a void ratio of approximately 49 percent. After the tire 20 experiences 0.188 inch of wear in the radial direction, the void ratio will be approximately 40 percent.

From the above description of the preferred embodiment of the invention, those skilled in the art will perceive improvements, changes and modifications. Such improvements, changes and modifications within the skill of the art are intended to be covered by the appended claims.

Having described a preferred embodiment of the invention, what is claimed is:

1. A vehicle tire with a tread, said tread comprising:
    a plurality of tread elements arranged in a substantially circumferential array about the outer circumference of the tire;
    each of said plurality of tread elements being at least partially defined by a leading edge surface, a trailing edge surface and a ground engaging surface; and
    each of said leading edge surfaces and said trailing edge surfaces has a smooth concave relief means wherein the surface of said relief means has a substantially constant radius of curvature, said relief means being located exclusively within the radially outermost 33 percent of the depth of a groove defined by a leading edge surface of a tread element and a trailing edge surface of a circumferentially adjacent tread element.

2. The tire set forth in claim 1 wherein the surface of said relief means makes an acute angle of approximately 90 degrees with a ground contacting surface portion of said tread element.

3. The tire set forth in claim 2 wherein said groove has a depth of at least 0.450 inch and said relief means is located exclusively within 0.150 inch of the ground contacting surface portion of said tread element.

4. The tire set forth in claim 2 wherein said groove has a depth of about 0.580 inch and said relief means is located exclusively within 0.188 inch of the ground contacting surface portion of said tread element.

5. The tire set forth in claim 1 wherein said relief means is a concave radiused surface extending in a direction substantially parallel to the extent of a respective one of said leading and trailing edge surfaces.

6. The tire set forth in claim 5 wherein said radiused surface has a constant radius of approximately 0.150 inch.

7. The tire set forth in claim 5 wherein said radiused surface has a constant radius of approximately 0.188 inch.

8. The tire set forth in claim 1 wherein circumferentially fore-and-aft leading and trailing edge surfaces on each tread element extend at an acute angle relative to a circumferential plane of the tire, said acute angle being less than 85 degrees and said relief means being formed on edge surfaces in the central portion of the tread width.

9. The tire set forth in claim 8 wherein said acute angle is less than 75 degrees.

10. The tire set forth in claim 1 wherein circumferentially intermediate leading and trailing edge surfaces extend at an acute angle relative to a circumferential plane of the tire, said acute angle being greater than 20 degrees.

11. The tire set forth in claim 10 wherein said acute angle is greater than 35 degrees.

12. A vehicle tire with a tread, said tire including a plurality of ground engagable tread elements, each of said tread elements at least partially defines a transversely extending groove, the improvement comprising a substantially smooth concave relief means located at the intersection of the groove and the ground contacting surface portion of the tread element, said relief means being incorporated for reducing the propensity to chunking of a leading edge of the tread element during operation of the tire, said relief means being located exclusively within the radially outermost 33 percent of the depth of the groove.

13. The tire set forth in claim 12 wherein the surface of said relief means makes an acute angle of approximately 90 degrees with a ground contacting surface portion of said tread element.

14. The tire set forth in claim 13 wherein said groove has a depth of at least 0.450 inch and said relief means is located within 0.150 inch of the ground contacting surface portion of the tread element.

15. The tire set forth in claim 12 wherein said relief means is a straight smooth concave radiused surface extending in a direction substantially parallel to the extent of planar surfaces defining the groove, said surfaces being in a central portion of the tread width.

16. The tire set forth in claim 15 wherein said radiused surface has a constant radius of approximately 0.150 inch.

17. The tire set forth in claim 15 wherein said radiused surface has a constant radius of approximately 0.188 inch.

18. The tire set forth in claim 12 wherein a radially innermost portion of said groove is defined at least partially by a substantially radially extending planar surfaces.

19. The tire set forth in claim 18 wherein said planar surface extends at an acute angle relative to a circumferential plane of the tire, said acute angle being less than 85 degrees and said relief means being formed on the planar surfaces in the central portion of the tread width.

20. The tire set forth in claim 19 wherein said acute angle is less than 75 degrees.

* * * * *